Figure 2:
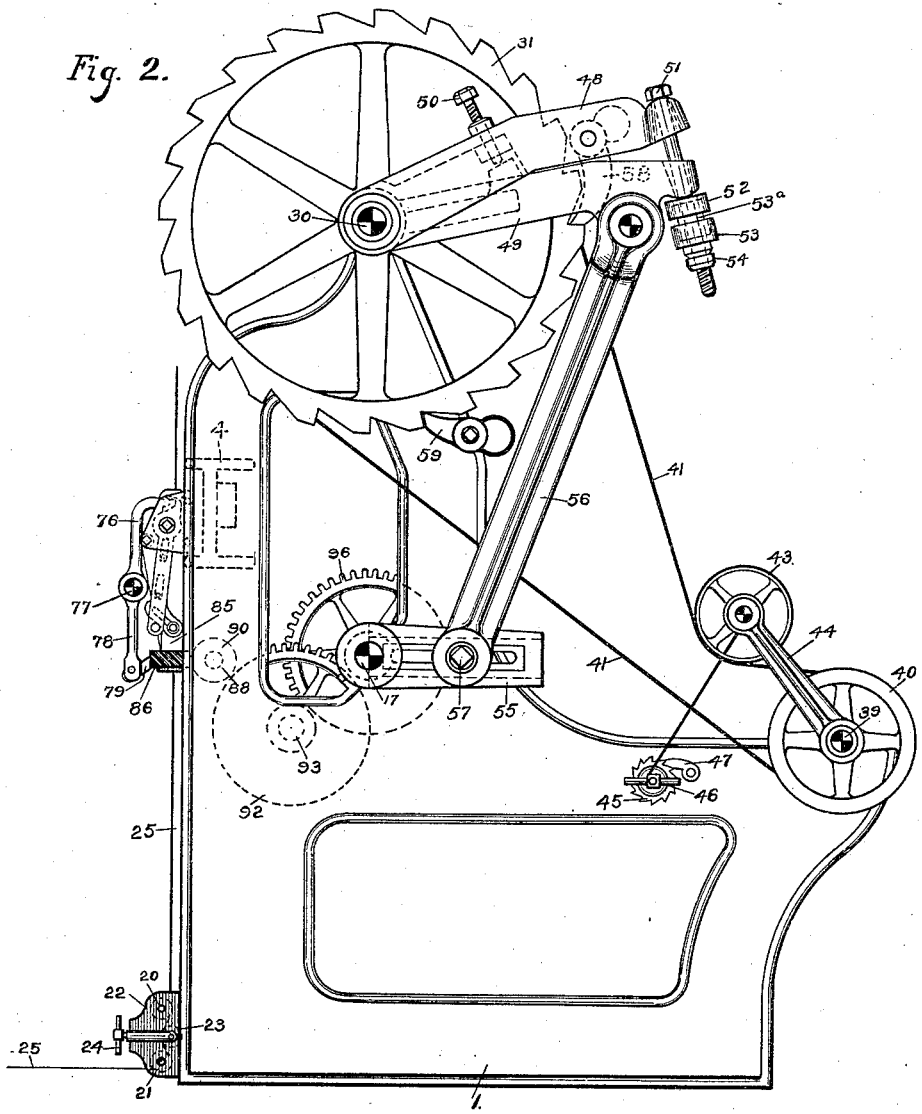

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 1.

Fig. 1.

WITNESSES:
Edwin C. Dozier.
Herbert R. Mallatt.

WILLIAM N. PARRISH.
INVENTOR.
BY Robert W. Randle
ATTORNEY.

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 3.

WITNESSES:
Edwin C. Dozier.
Herbert R. Marlatt.

WILLIAM N. PARRISH.
INVENTOR.
BY Robert W. Raudle.
ATTORNEY.

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 5.

WITNESSES:
Edwin C. Dozier.
Herbert R. Malatt.

WILLIAM N. PARRISH.
INVENTOR.

BY Robert W. Randle
ATTORNEY.

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 6.
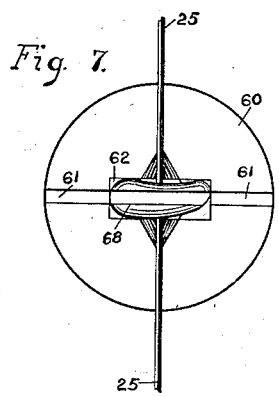
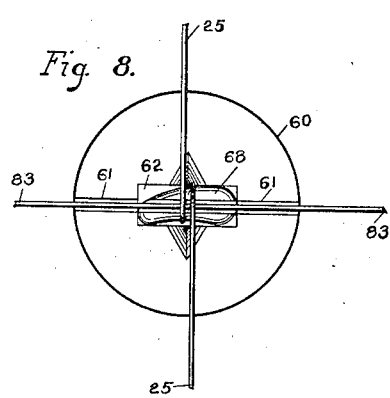
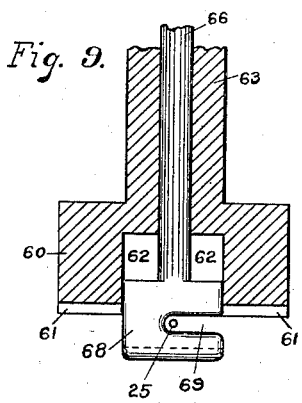
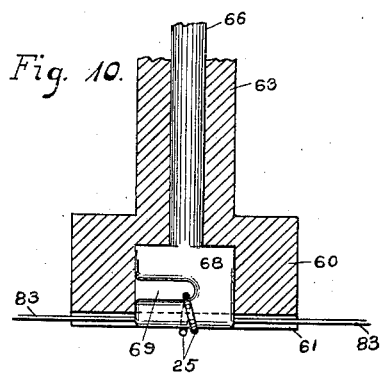
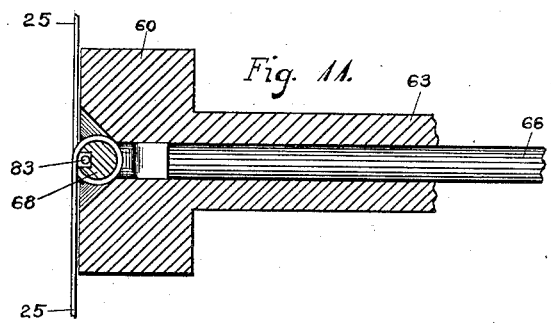
WITNESSES:
Edwin C. Dozier
Herbert R. Marlatt
WILLIAM N. PARRISH.
INVENTOR.
BY Robert W. Randle
ATTORNEY.

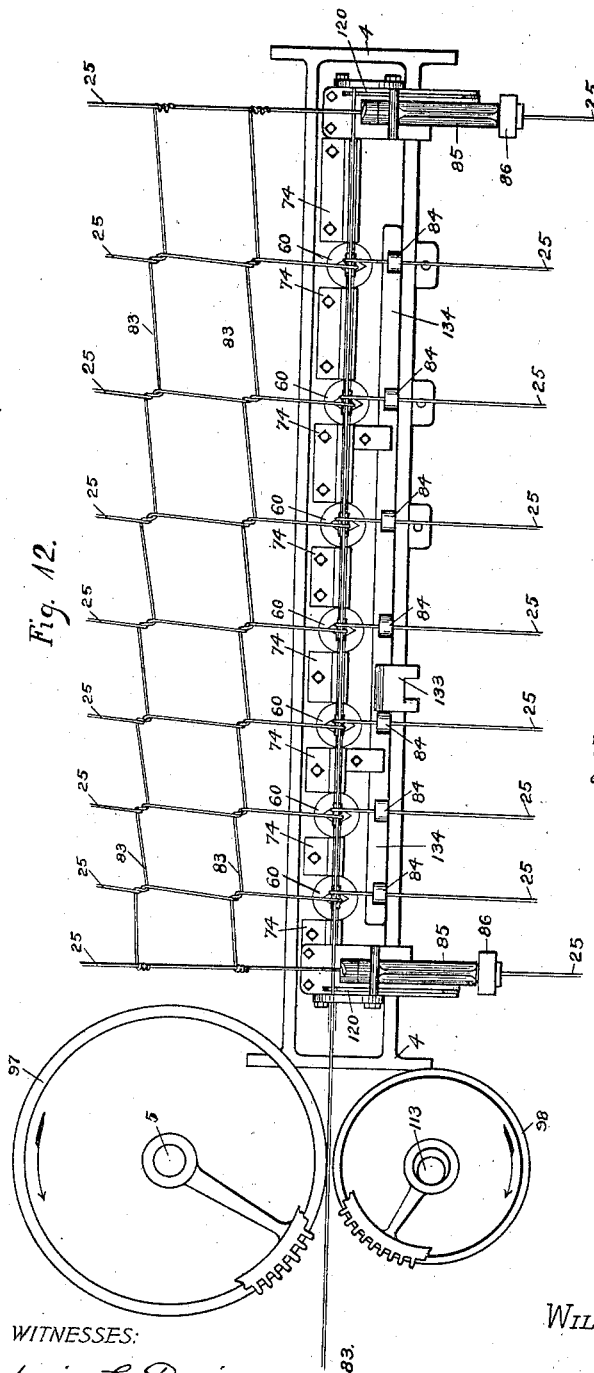

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 8.
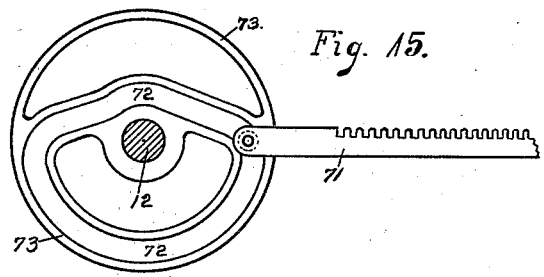
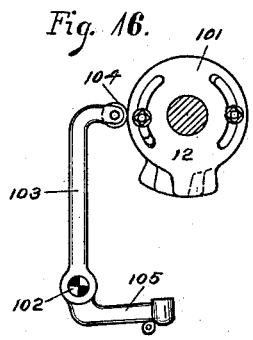 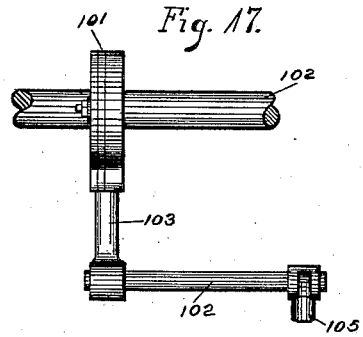
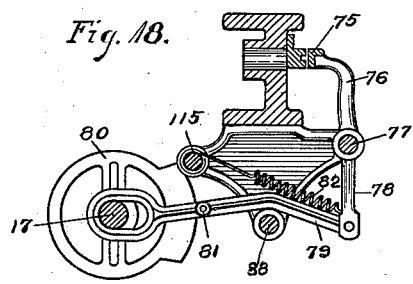
WITNESSES:
Edwin C. Dozier.
Herbert R. Marlatt.
WILLIAM N. PARRISH.
INVENTOR.
BY Robert W. Raudle
ATTORNEY.

No. 745,072. PATENTED NOV. 24, 1903.
W. N. PARRISH.
WIRE FENCE MACHINE.
APPLICATION FILED APR. 24, 1903.
NO MODEL. 10 SHEETS—SHEET 9.
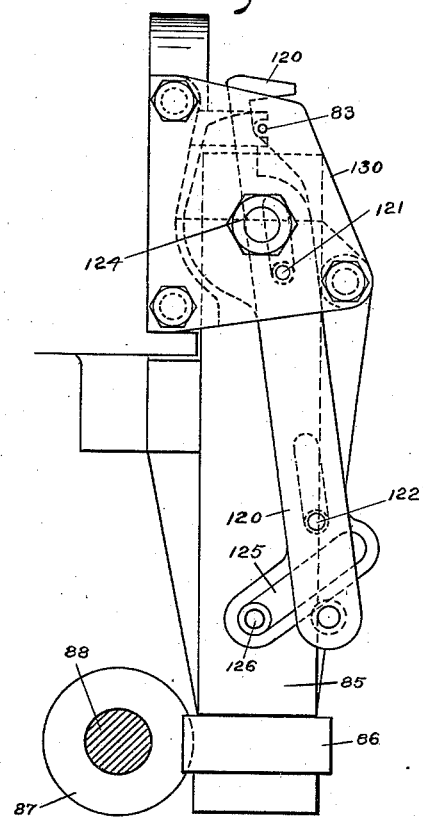
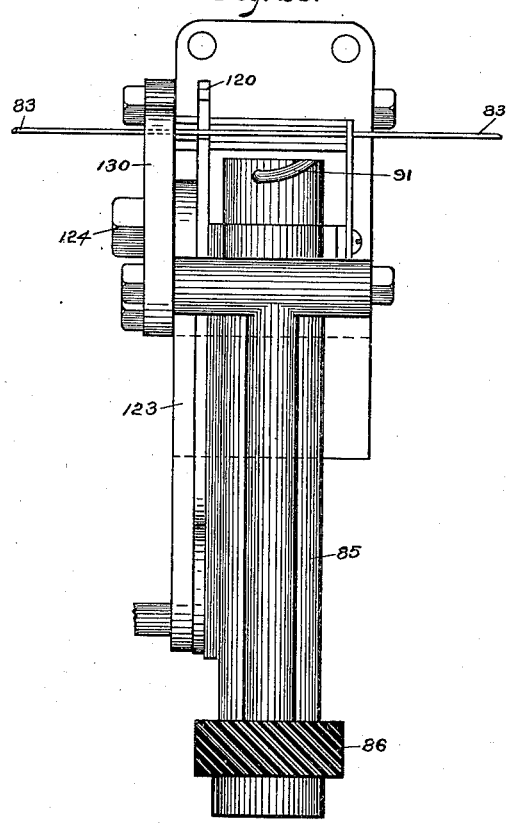
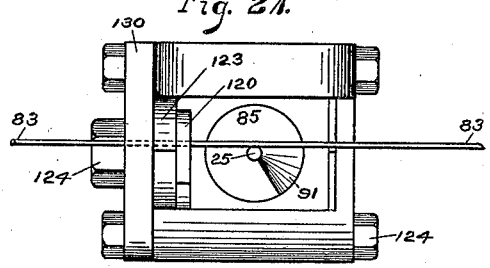
WITNESSES:
Edwin C. Dozier.
Herbert R. Marlatt.
WILLIAM N. PARRISH.
INVENTOR.
BY Robert W. Raudle
ATTORNEY.

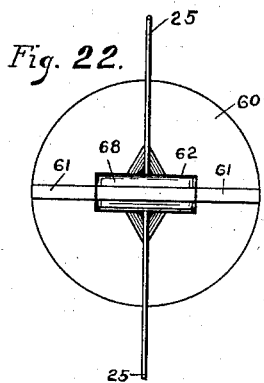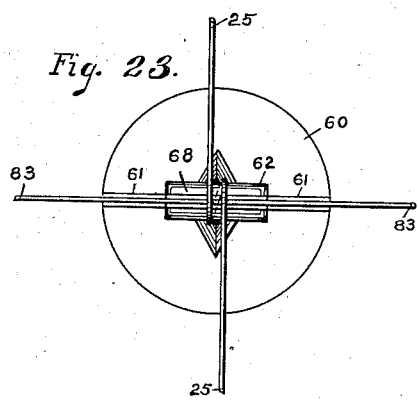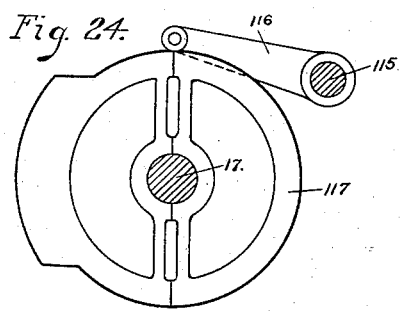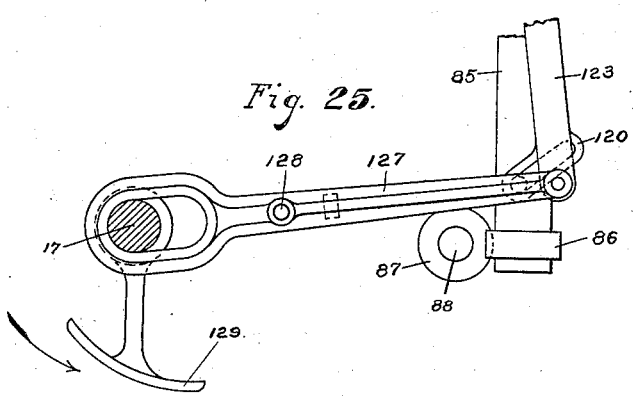

No. 745,072. Patented November 24, 1903.

UNITED STATES PATENT OFFICE.

WILLIAM N. PARRISH, OF RICHMOND, INDIANA, ASSIGNOR OF SEVEN-EIGHTHS TO ALVA L. KITSELMAN AND DAVID M. KITSELMAN, OF MUNCIE, INDIANA, AND CHARLES E. SHIVELEY AND WILLIAM H. ALFORD, OF RICHMOND, INDIANA.

WIRE-FENCE MACHINE.

SPECIFICATION forming part of Letters Patent No. 745,072, dated November 24, 1903.

Application filed April 24, 1903. Serial No. 154,180. (No model.)

*To all whom it may concern:*

Be it known that I, WILLIAM N. PARRISH, a citizen of the United States, and a resident of Richmond, in the county of Wayne and State of Indiana, (whose post-office address is Richmond, Indiana,) have invented certain new and useful Improvements in Wire-Fence Machines, of which the following is a specification, which when taken in connection with the accompanying drawings, forming a part thereof, is sufficiently clear and concise to enable others skilled in the art to which it appertains to make and use the same.

My present invention contemplates a radical reconstruction of the constituent elements of machines of this character, combined with new devices and operations and mechanical movements, the adoption of old principles with the mechanical elements and operations reduced to their simplest propositions, and as a natural sequence accentuating the utilitarian residual benefits and adapting them to subserve the highest economic ends.

In this invention my object, broadly speaking, is the provision of an improved machine of the class described which will automatically take in both the line and stay wires, secure the parts together at the desired points, properly space the meshes, forming a roll of the completed product, and repeat the operations as long as the machine is kept in action.

Another object is to provide a wire-fence machine in which a maximum of mechanical energetic efficiency will be developed with a minimum of power applied and at the same time providing a machine composed of a minimum of mechanical parts consistent with the work which it is adapted to perform which will be neat, artistic, and attractive in appearance, compact and symmetrical in proportions, strong and durable in construction, positive in action, and capable of a wide scope of usefulness and efficiency.

Another object is the provision of a wire-fence machine composed of interdependent and coöperating elements so arranged and combined as to produce an unvarying perfectly constructed product and at the same time performing the work more rapidly than has heretofore been attained.

Still another object is to provide an improved wire-fence machine which involves simplicity of construction and operation, in which the greatest possible efficiency or working power is secured with a minimum of motive power applied thereto, and whereby the operator will be enabled to control its operations, so that its work may be changed or shifted when desired with certainty and precision.

Other objects and specific advantages of my invention will appear from the following specification, from the accompanying drawings, forming a part thereof, and as colligated, in the claims hereunto appended.

In carrying out the general objects referred to by the construction and arrangement constituting the present invention I arrange the various devices and several parts and the several essential elements in approximately—that is, substantially — progressive succession—that is to say, at one operation and with but one movement of the operator to produce the predetermined results and without substantial or prolonged intervals between any two general effects.

The distinctive features of my present invention, briefly stated, consist of a substantial framework; a series of novel twister-heads, and the method and manner of operating same; the mechanism for inserting the stay-wires and for cutting them off at the proper point; the gate for automatically contacting with the faces of the twister-heads; the bull-dowser for advancing, crimping, and shaping the product; the feeding mechanism; the tensions; the mechanism for receiving and rolling the finished product, and the shafts, pulleys, cams, and pitmen for operating said parts in order that the work of each may be performed with unanimity and precision.

My invention consists in a wire-fence machine embodying new and useful features and details of construction and relative disposition of the several parts, substantially as particularly described elsewhere in this specification, and in the legitimate combinations herein set forth.

The simplicity of my invention, together with its positiveness of action and effectiveness and efficiency of the resultant operations, will appeal to any one familiar with the management and maintenance of machines of this character, and while I am aware that wire-fence machines of a somewhat similar character have been constructed, yet in my opinion they all more or less lack that positiveness of action and adaptation and intermutual relationship of the several elements which should characterize machines of this kind, and in my opinion the crux of the whole matter lies more particularly in what has been heretofore the inability of providing a series of twister-heads of the proper mechanical construction to produce commensurate results in a simple and positive manner. This trouble I have overcome in the construction herein shown and described, and as a result it will be apparent that a higher and better grade of the finished product will be the result and at a reduced cost of production.

In this construction I have attempted to cordinate, systemize, and harmonize a great variety of movements and to bring into line with the general scheme of operation a number of important mechanical movements which heretofore have had a more or less independent existence and power of initiative in order that in the operation there will be no discordant elements.

One manner of carrying out the invention and that which in practice has been found most desirable is illustrated in the accompanying drawings, in which—

Figure 3:
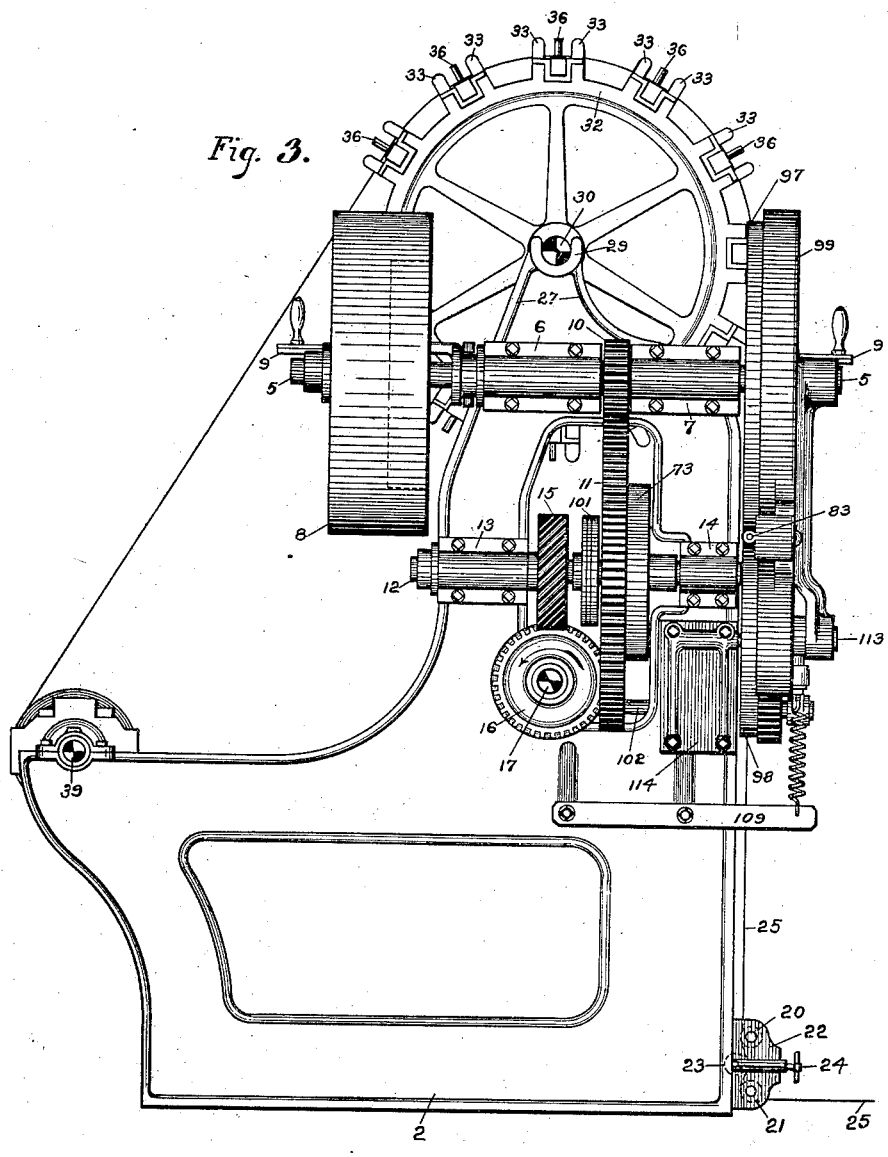
Figure 4:
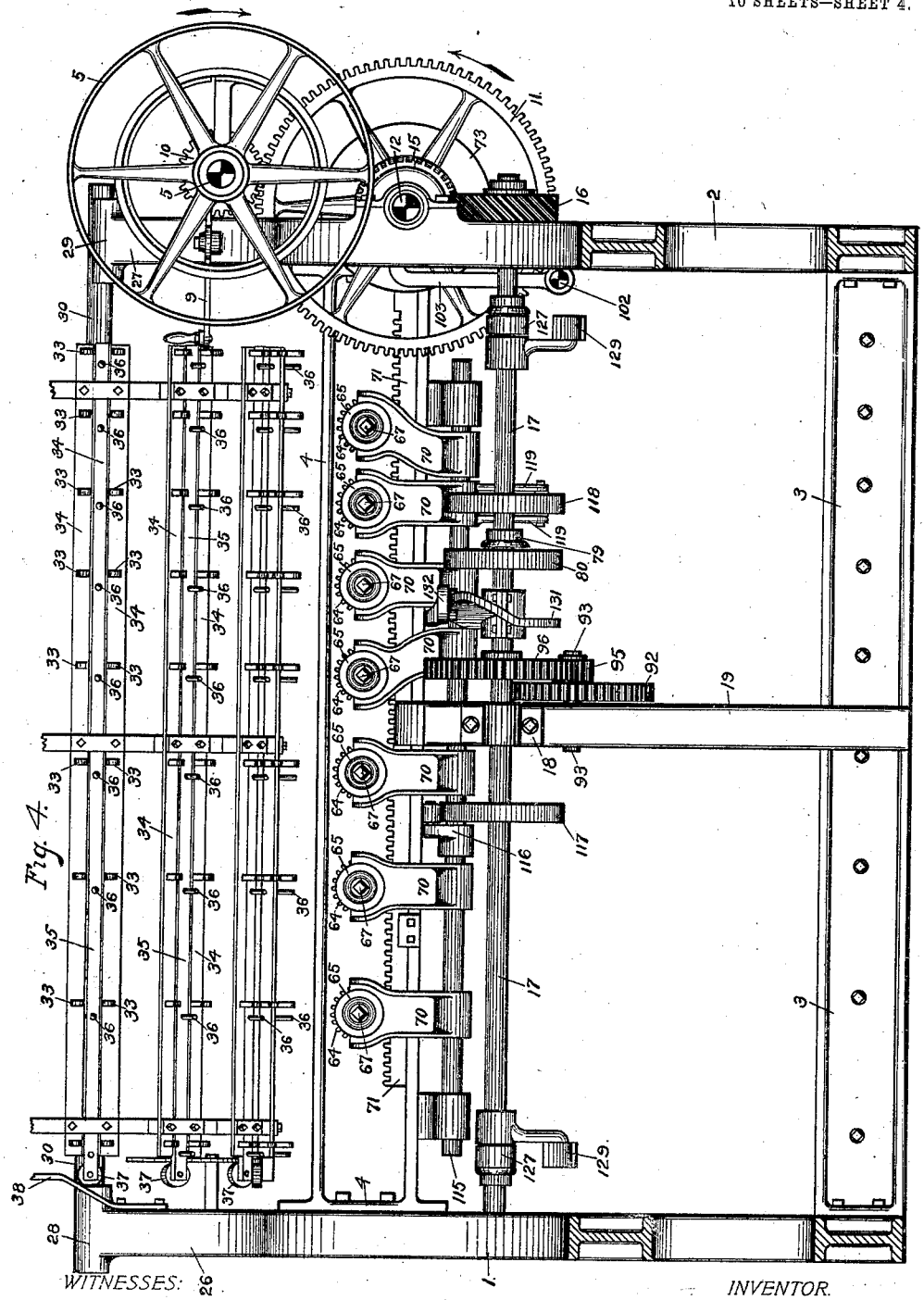
Figure 5:
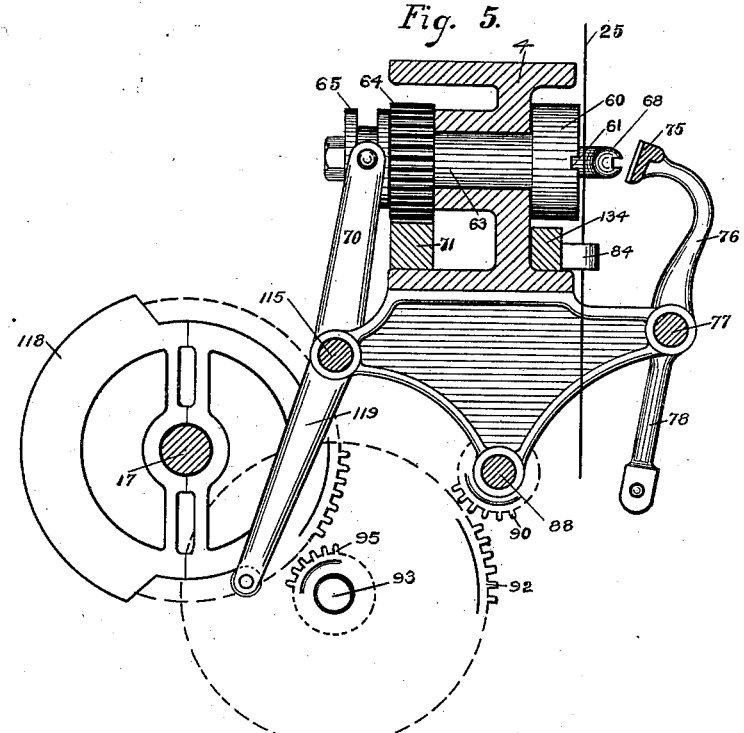
Figure 6:
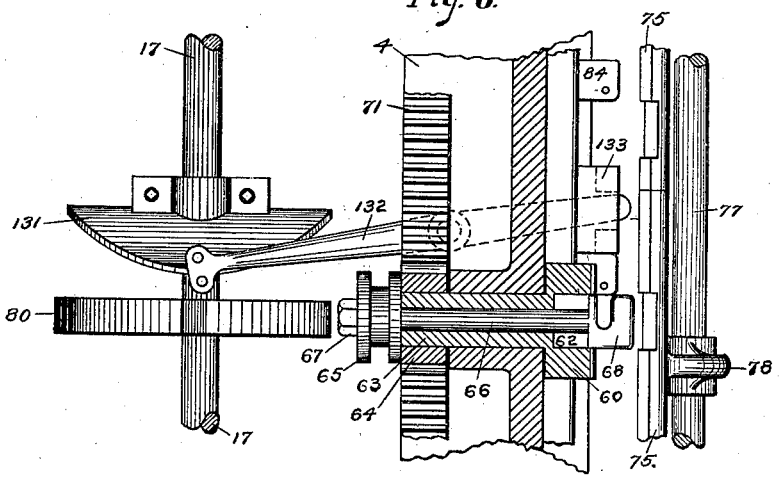

Figure 1 is a front elevation of my machine. Fig. 2 is an end view of the right-hand end of my machine. Fig. 3 is an end view of the left-hand end of my machine. Fig. 4 is a rear elevation of the machine. Fig. 5 is a detail, partly in section, showing one of the twisters positioned, also the cam for moving the fingers rearward and an elevation of a portion of the gate. Fig. 6 is a detail, partly in horizontal section, showing one of the twisters, a portion of the gate, and the operation of the wabble-wheel and arm. Fig. 7 is a detail showing the face of twister-head and a line-wire positioned thereacross. Fig. 8 is a view similar to that shown in the preceding view showing one of the movements in connecting the stay and the line wires. Fig. 9 is a detail showing one position of the fingers of the twisters in connecting the line and the stay wires. Fig. 10 is a view similar to the preceding view showing another position of the fingers. Fig. 11 is a longitudinal sectional view of a twister head and fingers, showing a loop formed in the line-wire thereby. Fig. 12 is a face view of all the twisters, showing the line-wires, manner of inserting the stay-wires, and a portion of the finished product. Fig. 13 is a detail showing a line-wire and manner in which the stay-wires are connected thereto at each end. Fig. 14 is a detail showing the tie or manner in which the stay-wire and the line-wires are united at their points of intersection. Fig. 15 is a detail showing a portion of the rack and cam for moving same to revolve the twisters intermittently. Fig. 16 is a detail showing the three-part or triple cam and mechanism for contacting the wheels for shooting the stay-wires. Fig. 17 is a detail of same parts shown in the preceding view taken at right angles thereto. Fig. 18 is a detail cross-section showing the mechanism for operating, opening, and closing the gate. Fig. 19 is a detail showing the device for gripping the ends of the stay-wires and means for the excision of the stay-wires to proper length. Fig. 20 is a detail showing the device for twisting the ends of the stay-wires around the outside or end line-wires. Fig. 21 is a detail upper end view of the device shown in Fig. 20. Fig. 22 is a detail showing only slight modifications of that shown in Fig. 7. Fig. 23 is a detail showing only slight modifications of that shown in Fig. 8. Fig. 24 is a detail showing the cam and arm for moving the yokes forward in the proper time. Fig. 25 is a detail showing the mechanism for operating the fingers for gripping and holding the ends of the stay-wires and the arm for the excision of the ends of the stay-wires.

Similar indices refer to and denote like parts throughout the several views of the drawings.

With all of the above-named views in mind I will now take up the description in detail, which I will refer to as briefly and compactly as I may.

In the drawings the numeral 1 designates the right and 2 the left end members of the main frame of my machine, by which the various parts are supported, said parts being connected by various cross members—as, for instance, the member 3, located at the lower front corner, carrying the tension devices, and the member 4, located centrally of the front of the machine, forming the I-shaped bed-plate for carrying some of the principal devices of my machine, as will elsewhere appear herein.

Mounted horizontally across the outside of the end member 2 is the main operating-shaft 5, carried revolubly in the boxings 6 and 7 and shown in Fig. 3. To the rear end of the shaft 5 is secured a pulley-wheel 8, by which said shaft may be continuously revolved. The numeral 9 represents a slide for throwing my machine into and out of gear, operative by handles accessible from both the front and rear of the machine, which operates a friction-gear within the wheel 8, of any well-known construction.

On the shaft 5, between the boxings 6 and 7, is secured a pinion 10, meshing with the larger gear-wheel 11 immediately below it. Below the shaft 5 and parallel therewith is the secondary shaft 12, carried in the boxings 13 and 14, as shown in Fig. 3, on which shaft is mounted the gear-wheel 11, above referred to. On the shaft 12, between the wheel 11 and the boxing 13, is secured a right-angular spiral gear-wheel 15, meshing at right angles with a similar spiral gear-wheel 16, located immediately below it. The gear-wheel 16 is secured to the longitudinal shaft 17, which shaft extends between the members 1 and 2, in which it is revolubly mounted, and is supported in its center by the boxing 18, which latter is secured to the center post 19.

The above parts constitute, primarily, the basic parts of my machine, which carry and operate the several specific devices which I will now refer to.

I have shown a machine adapted for nine line-wires, although it is apparent that it may be adapted for a greater or less number of line-wires, as desired.

In Fig. 1 are shown the tensions, one for each line-wire, mounted on the member 3, each of the tensions consisting of two stationary revolubly-pivoted grooved pulleys 20 and 21, pivoted in hangers 22, and a movable pulley 23, carried horizontally by a screw operative by the cross-bars 24.

The numeral 25 represents the line-wires of the fence to be formed in the machine.

It will be apparent that as the line-wires are drawn from their source of supply their tension to the machine may be regulated by turning the cross-bars 24 as desired.

*The bulldowser.*—This device is shown in elevation partly in Figs. 1 and 4, and an end view thereof is shown in Fig. 3. Rising from the upper portions of the members 1 and 2 are hangers 26 and 27, respectively, carrying the respective U-shaped bearings 28 and 29, and revolubly mounted in the bearings 28 and 29 is a shaft 30, which carries the bulldowser. Mounted on the shaft 30, outside the member 1, is the double ratchet and pulley wheel 31. (Shown in Figs. 1 and 2.) The bulldowser proper consists of a plurality of wheels 32, (shown in Fig. 3,) secured to the shaft 30 and revolved thereby. The peripheries of the wheels 32 carry pairs of strips 34 longitudinally thereacross, which strips have pairs of fingers 33 extending up therefrom, each pair of fingers disposed according to the size of the mesh to be formed in the fence and on a line with the line-wires 25. Between each pair of strips 34 and the fingers 33 is a horizontal slidable bar 35, extending out therefrom at the right-hand end. The right-hand end of the bars 35 are somewhat longer than the strips 34, and on these extensions are mounted small rollers 37. (Shown in Figs. 1 and 4.) Secured to the inside of the member 1 is a deflector 38, against which the rollers 37 are adapted to contact to move the bars 35 endwise toward the opposite end of the machine, by which the line-wires lying between a pair of fingers 33 and a pin 36 are crimped and equalized and also affording means by which the line-wires are gripped by the bulldowser in order that it may advance the line-wires the proper space for a mesh.

*The spool.*—On the rear points of the members 1 and 2 is mounted a revoluble spool of any suitable construction carried by the shaft 39, Figs. 2 and 3. The right-hand end of the shaft 39 is provided with a pulley-wheel 49, Fig. 2, over which passes the belt 41, which belt also passes over the pulley 42 on the shaft 30, by which the spool is revolved in the proper predetermined time. In order to control the tension of and tighten the belt 41, I have provided an idle wheel 43, which wheel 43 is carried on the outer end of the arm 44, the latter being mounted at one end around the shaft 39. Pivoted on the outside of the member 1 (shown in Fig. 2) is a small handoperative shaft 46, on which is secured the ratchet-wheel 45, with a pawl 47, adapted to retain the shaft 46 at the point desired. A cord, cable, or the like is secured to the outer end of the arm 44 and to the shaft 46, by which the tension of the idle pulley 43 may be controlled.

*Means for advancing the bulldowser.*—Referring to Fig. 2, the bulldowser is advanced step by step by revolving the double-ratchet wheel 31. This is accomplished by the double arms 48 and 49, pivoted at their inner ends on the shaft 30, but not revolved thereby, the outer end of the former being bent inward in order that its outer portion may be immediately above the arm 49. A set-screw 50 in the arm 48 is so disposed that its point may contact with the arm 49 in order that the arms 48 and 49 may be retained a predetermined distance apart. Eyes in alinement with each other are formed in the outer parts of the arms 48 and 49 to receive the bolt 51, which bolt passes downward through said eyes. Placed loosely around the bolt 51, below the arm 49, are two heavy washers 52 and 53, between which is placed a gasket 53ª, and adjoining the lower washer on the bolt 51 are one or more adjusting-nuts 54, as shown. Secured to the outer left-hand end of the shaft 17 is a slotted finger 55. Pivoted to the finger 55 is an arm or pitman 56, adjustably connected by the bolt 57. The upper end of the arm 56 is pivoted to the arm 49 near its outer end. Near the outer end of the arm 48 is pivoted a pawl 58, (shown in dotted lines,) whose point is adapted to engage in the outer rack of the ratchet-wheel 31. A retaining-pawl 59 is pivoted to the member 1, which engages in the inner rack of the ratchet-wheel 31 to prevent backlash of the ratchet-wheel. As has already been inferred, the ratchet-wheel 31 is provided with a double rack, one on each side, with the belt-space therebetween, the outer rack appearing in the drawings in Fig. 2 and the inner rack in Fig. 1, said racks being integral parts of the wheel 31. It will now be seen that when the shaft 17 is revolved the finger 55 will be carried around thereby. The arm 56 will act as a pitman, carrying the arms 48 and 49 alternately up and down, thus causing the pawl 58 to engage and advance the wheel 31, carrying the bulldowser revolubly therewith, and that while the pawl 58 is retreating for a new bite the pawl 59 will hold what has been gained.

*Main twisting mechanism.*—I now come to one of the most important mechanisms of my machine, which I term the "main twisting" mechanisms, which in this instance are seven in number. (Shown most clearly in Figs. 5, 6, 8, 9, 10, and 11.) These consist each of a head 60, with an open channel 61 across its face and an open oblong cavity 62 in the center of the face. 63 represents the shank of the twister, with a round longitudinal opening therethrough, which opens centrally into the opening 62. On the rear ends of the shanks 63 is a gear-pinion 64, which may be integral thereof, and immediately back of the latter is a channel-wheel 65, which is mounted on the stem 66, secured thereto by the bolt 67. Integral of the stem 66 is a finger-head 68 of a size to neatly fill the opening 62, with a U-shaped slot 69, formed into one side substantially half-way therethrough, as shown in Figs. 9 and 10, and with a channel across its face corresponding and alining with the channel 61 when the head 68 is fully in the opening 62. The twister-heads thus formed are each carried in a yoke 70. (Shown in Fig. 4.)

*Device for revolving the twister-heads.*—Mounted slidably on the upper surface of the lower part of the bed-plate 4 is a transversely-disposed rack 71, Figs. 4, 5, and 15, arranged in suitable guides. One end of the rack 71 has a roller pivoted on its side which is adapted to be carried in the cam-channel 72, formed in the face of the cam-wheel 73, as shown in detail in Fig. 15, which wheel 73 is carried revolubly by the shaft 12 and by which the rack 71 is given a differential lateral movement to turn the twisters in the proper time revolubly back and forth. It will be observed that as the wheel 73 revolves there will be a space of time when the rack 71, and consequently the twisters, will be quiescent or at a dead-stop sufficient in which to shoot the stay-wire 83 across the faces of the twisters through the channels 61. In order to constitute the channels 61 continuous from end to end of the machine, I have provided guides 74 between each two of the heads 60 and at each end with lateral channels in their faces corresponding with the channels 61. Also I have provided a gate consisting of a transverse bar 75, Figs. 1 and 5, on alinement with and adapted to contact with said channels, and thus making the channels in the nature of a barrel.

*The gate.*—The bar 75 is carried by the arms 76, and the lower ends of these arms are adjustably connected to the rocking shaft 77. Secured to and extending down from the shaft 77 is an arm 78, pivoted to the lower end of which and extending rearward is the arm 79, whose rear end is eccentrically mounted on the shaft 17 by a yoke, on which shaft 17 is also secured the cam-wheel 80. At the proper point on the arm 79 is mounted a roller 81, as shown. Secured at one end to the lower end of the arm 79 is a helical spring 82, the other end of said spring being secured to some stationary point, as the shaft 115, in order to keep the spring in tension, said spring tending normally to keep the gate open—that is to say, to keep the bar 75 from contact with the faces of the twisters 60 and the guides 74. As the wheel 80 revolves it will be apparent that the cam thereon will engage the roller 81, and while the roller 81 is traveling on the periphery of the cam the gate will be closed, as in Fig. 18, (which will be the period at which the stay-wire 83 is being shot through said channel,) while at the balance of the revolution of the wheel 80 the spring 82 will be free to retain the gate open, as in Figs. 5 and 6.

With an understanding of the above-named construction I now come to the disposition of the line-wires 25. This is accomplished by bringing the line-wires from their source of supply through the tensions at the front of the machine, as shown in Figs. 2 and 3, then upward through the guides 84, (shown in Figs. 1, 5, and 12,) through the slots 69 in the heads 68, said slots being turned to the right, as shown in Fig. 9, then upward over the bulldozer between a pair of fingers 33 and a pin 36, as shown in Fig. 3, then downward to the spool to which they are secured. The two outside line-wires 25 in place of passing through guides 84 and twister-heads are especially provided for, as shown in Fig. 1, which will be explained elsewhere hereinafter. The line-wires being threaded in the machine, as just explained, it will now be apparent that if the finger-head 68 be drawn into the opening 62 and the heads 60 be given a half-turn a loop will be given to the line-wire around the finger of the head 68, as shown in Fig. 10, and also that when in this position the channel in the face of the heads 68 will be in alinement with the channels 61. It will now be observed that if the gate be closed, contacting the bar 75 with said channels, if a stay-wire 83 be inserted endwise from the left-hand end of the machine into the said channel 61, the channel in the guides 74, and the channels across the faces of the finger-heads (all of which are in alinement with each other at this point, the gate being closed) that said stay-wire will of necessity pass through the eye of the loops formed in the line-wires above referred to. Should the gate now be opened, the finger-heads pressed forward and given a quarter-turn, so that the slot 68 will face upward, and if immediately thereafter the bulldowser should advance the line-wires upward the width of the mesh to be formed, it will be seen that the loops will be withdrawn from the fingers of the heads 68 and the stay-wire will be locked to the line-wires at each intersecting-point, except the ends, which are especially provided for and which will be accomplished simultaneously therewith. The tensions on the line-wires in connection with the crimpers on the bulldowser above referred to will equalize and close the loops, causing the ties to assume the appearance represented in the upper portion of Fig. 12 and in detail in Fig. 14.

I will now refer to the devices for securing the ends of the stay-wires to the end line-wires, which devices are shown in Fig. 12 and in detail in Figs. 19, 20, and 21. These two devices being of identical construction, a description of one will suffice for both. These devices consist, primarily, of a vertically-disposed barrel 85, carried in a suitable hanger, with a longitudinal opening therethrough to allow the outside line-wire to pass therethrough, as indicated. On the lower end of said barrel is a spiral gear-wheel 86, meshing at right angles with a similar spiral gear-wheel 87, by which the barrel 85 is revolved. The gear-wheels 87 are mounted on each end of the shaft 88, which shaft is revolubly mounted in the three hangers 89, which shaft 88 is carried by the gear-wheel 90, secured thereto, as in Fig. 1. The gear-wheel 90 meshes with the large gear-wheel 92, which latter is secured to the shaft 93, and the shaft 93 is mounted in the boxing 94, which latter is secured to the front face of the post 19, as shown in Fig. 1. Secured to the shaft 93 is the pinion 95, which meshes with the gear-wheel 96, and the wheel 96 is carried by the shaft 17, on which it is mounted. In the upper end or face of the barrel 85 from the center outward on one side is a radiating slot 91, as shown in Figs. 20 and 21. By the devices just described it is manifest that, the end wires 25 extending upward through and beyond the barrels 85, the centers of the barrels being slightly to one side of the path the wire must travel to enter said channel, the path of the wire 83 being across the faces of the barrels 85, that after the wire 83 has been positioned in said channel the fingers 120 will at once be drawn down and will press the ends of the wire 83 against the faces of the barrels 85. The barrels 85 continuously revolving, the wire 83 will engage in the slots in the ends of said barrels, and by the revolutions of the barrels the ends of the wire 83 will be twisted around the end wires 25 in the manner shown in Figs. 12 and 13, after which the fingers 120 will rise into position for another stay-wire to be inserted in said channel. As the fingers 120 descend to grip the ends of the stay-wire the upward projection on the left-hand arm 123 will sever the stay-wire to the left of the adjoining arm 120, as will hereinafter be explained.

*The stay-wire-inserting mechanism.*—This mechanism is shown most clearly in Figs. 1, 3, and 12 and consists, primarily, of two gripping-wheels 97 and 98, carried in the casing or frame 99 common to both wheels, said frame being mounted to the left end of the main frame of the machine. The gripping-wheel 97 is secured to and continuously revolved by the main shaft 5, and the wheel 98 is revolved by the wheel 97. The front half of the faces or peripheries of the wheels 97 and 98 are provided with gearings adapted to mesh with each other, as indicated in Fig. 12, in order that the wheel 98 may be revolved continuously by the wheel 97. The smooth face portions of the peripheries of the wheels 97 and 98 are adapted to be contacted with each other, or nearly so, by means of the wheel 98 being eccentrically mounted, as shown in Fig. 1, the smooth faces of the wheels 97 and 98 being movable thereby toward and away from each other by the movement of the outer end of the arm 100 up or down, which is accomplished automatically at determined intervals by the mechanism which I will describe. Mounted on the shaft 12 is a three-part adjustable cam-wheel 101, (shown in Fig. 3 and in detail in Figs. 16 and 17,) so constructed that the cam portion thereof may be adjusted to vary the time of contact of the faces of the wheels 97 and 98 to meet the various requirements to vary the length of the stay-wires. Numeral 102 represents a short shaft mounted on the inside of the member 2 by a suitable hanger or boxing. Extending up from the rear end of the shaft 102 is an arm 103, with its upper point curved inward and provided with a contact-roller 104, as shown in Fig. 16, which roller travels on the periphery of the cam-wheel 101. To the forward end of the shaft 102 is secured the arm 105, which extends out toward, below, and oppositely disposed to the arm 100. Eyes opposite to each other are formed through the ends of the arms 100 and 105, Fig. 1. Said arms 100 and 105 are resiliently connected by a bolt 106, and between the eyes of said arms and around the center portion of said bolt is a helical cushion-spring 107. Secured in an eye formed on the under side of the outer end of the arm 105 is a helical spring 108, the lower end of said spring being attached to the stationary bar 109, which latter is secured to the outside face of the member 2, the object of the spring 108 being to normally keep the smooth faces of the wheels 97 and 98 apart. It will now be seen that as the shaft 12 revolves, carrying the cam-wheel 101, that as the roller 104 strikes the cam of the wheel 101 the outer end of the arm 105 will be thrown up and that this will throw up the end of the arm 100 against the resiliency of the spring 107, thereby causing the smooth faces of the wheels 97 and 98 to contact, or nearly so, at predetermined intervals. The contacting points of the faces of the wheels 97 and 98 are on alinement with the channels in the twisters above referred to, whereby as the end of the wire 83 may be inserted between the wheels 97 and 98 and will be gripped thereby then the roller 104 is on the cam of the wheel 101, the length of said cam being so adjusted that the interval of contact of the roller 104 therewith will be the same as that required in which to shoot the end of the stay-wire to the right-hand end of said channel above referred to.

Extending outward from the frame 99 and integral thereof is a projection 110, Fig. 1, carrying a hollow guide 111, through which guide the stay-wire 83 is fed to the machine through between the wheels 97 and 98. A series of oppositely-disposed rollers (not shown) are placed between the inner end of the guide 111 and the point of contact of the wheels 97 and 98, forming a tension similar to that formed by the tensions consisting of the pulleys 20, 21, and 23, above referred to. The numeral 112 represents a tube-guide extending from the stationary frame of the left barrel 85 to near the contact-point of the wheels 97 and 98. By the above it will be seen that the wire 83 may be inserted in the guide 111, its point being beyond the contact-point of the faces of the wheels 97 and 98, and that when the arm 100 is pulled down the wire 83 will be grasped and by the revolutions of the wheels 97 and 98 will be shot through the guide 112 and through said channel.

The wheel 98 is eccentrically mounted on the shaft 113, whose forward end is pivoted in the frame 99, and the rear end is pivoted in the upper portion of the boxing, (represented by the numeral 114.)

The yokes 70 are permanently secured to the rocking shaft 115, Fig. 4, the upper points of the yokes 70 entering on each side in the channel formed in the wheel 65, as seen in Fig. 5. Also secured to the shaft 115 is an arm 116, Fig. 24, with a contact-roller on its outer end. Secured to the shaft 17 is a cam-wheel 117, on whose periphery the roller of the arm 116 is adapted to travel and by which the yokes 70 are moved forward—that is, to the position shown in Fig. 5. Also mounted on said shaft 17 is a cam-wheel 118, and extending down from the shaft 115 is a double arm 119, straddling a segment of the cam-wheel 118, with a roller mounted in the forks to travel on the periphery of the cam-wheel 118, the object of this being to draw the yokes rearward at each revolution of the cam. The double arm 119 may be integral of and be a downward extension of one of the yokes 70, as indicated in Figs. 4 and 5.

The fingers for gripping the ends of the stay-wires are shown in Figs. 1, 2, 12, 19, and 20, and means for operating same is shown in detail in Fig. 25, one of these devices being located at each end of the machine opposite the ends of the channel above referred to and are of similar construction. Said fingers are represented by the numerals 120 in said views and are mounted on the outer sides of the boxings, which carry the barrel-twisters 85, by studs 121 and 122, as seen in Fig. 19. Parallel and contacting with the fingers 120 are arms 123, Fig. 20, pivoted by the bolts 124. In the lower end of the fingers 120 is an angular slot 125, in which operates a stationary stud 126. Pivoted to the lower end of the arm 123 is a rearwardly-projecting arm 127, Fig. 25, with a yoke-strap on its rear end surrounding the shaft 17. At a point on the arm 127 is mounted a roller 128, and on the shaft 17 is secured the wiper-cams 129, the inner projecting faces of which cams will contact with the rollers 128 at each revolution of the shaft 17 and draw the arms 127 rearward, thus causing the points of the fingers 120 to be pulled down bringing the ends of the stay-wire into engagement with the ends of the barrel-twisters, as will be clearly seen from the drawings. On the left-hand end of the machine the arm 125 extends upward above and back of the path of the stay-wire, as shown in Fig. 20, and as the finger 120 is pulled down on the stay-wire this upward projection of the arm 123 will pass forward and downward over the opening in the plate through which the line-wire passes and will sever or cut off the stay-wire at this point.

On the shaft 17 at the point shown is secured the wabble-wheel 131 (shown in Figs. 4 and 6) and pivoted on the under side of the bed-plate 4 is an arm 132, reaching rearward, with downwardly-projecting studs therein adapted to straddle the rim of said wabble-wheel. The forward end of the arm 132 is adapted to play in the forks of the block 133, the block 133 being secured to the horizontal slidable bar 134, which rests on and is carried by the lower forward chime of the bed-plate. The wabble-wheel is geared to move the guides 84 to the left in the proper time to cause the line-wires to enter the slots 69 of the finger-heads and to then move them to the right when this is accomplished.

There are no natural divisions between the various mechanisms described, they all being operated and controlled from a single source of power, and the various gears, cams, levers, arms, fingers, and pulleys are so nicely proportioned that the various operations follow each other in proper order and with certainty and precision and forming a mechanical construction of the several mechanisms and parts to produce a single result.

In consideration of the machine as a whole the twisters and stay-wire-inserting mechanism, as before intimated, may be regarded as constituting the main or important features of the machine and the other mechanisms and devices as auxiliary thereto, the combined mechanisms and devices acting in harmony for the accomplishment of a single definite primary result—that is, the formation of a woven-wire fabric.

From the above description, taken in connection with the accompanying drawings, it will be seen that I have produced an improved wire-fence machine embodying the objects otherwhere referred to in this specification.

While I have illustrated and described the best means now known to me for carrying out my invention, I wish it to be understood that I do not restrict myself to the exact details of construction shown and described, but hold that any slight changes or variations in such details as would suggest themselves to the ordinary mechanic would clearly fall within the limit and scope of my invention.

The terms "in," "out," "right," "left," "vertically," "horizontally," and other similar terms are used for convenience of description, and it is not intended by the use of such terms to limit the arrangement and operation of the several parts to the relative positions indicated.

Having now fully shown and described my invention and the best means for its construction and operation to me known at this time, what I claim as new is—

1. In a wire-fence machine having a main shaft at right angles to the machine and across one end thereof operating continuously by power, a gripping-wheel carried on one end of said shaft, a second gripping-wheel eccentrically mounted below the first-named gripping-wheel and revolved thereby, a three-part adjustable cam secured on said main shaft, means for moving the second gripping-wheel toward and from the first gripping-wheel intermittently by said cam for gripping and releasing a wire which may be between the faces of said gripping-wheels, substantially as shown and described.

2. In a wire-fence machine, the combination of a supporting-frame, a series of twister-heads operated by power to revolve vertically in unison, channels formed across the faces of the twister-heads, a gate for contacting with the faces of the twister-heads, line-wires extending vertically across the faces of the twister-heads, a mechanism for shooting the stay-wires horizontally through the channels of the twister-heads when said channels are in alinement, means for turning the twister-heads to unite the line-wire and the stay-wire at their intersecting points, and a bulldowser for spacing and carrying the line-wires and for carrying forward the finished product, substantially as shown and described.

3. In a wire-fence machine, the combination of the supporting-framework carrying a horizontally-arranged series of twister-heads adapted to revolve vertically, a groove formed across the face of each twister-head, a gate for contacting with the faces of the twister-heads forming a continuous channel through which a stay-wire may be inserted, and a line-wire passing vertically across the face of each of the twister-heads, and means for engaging the wires by the tongue of the twister-heads and means for revolving the twister-heads to lock the stay-wires to the line-wires at the intersections, substantially as described and for the purposes set forth.

4. An automatic wire-fence machine operative by power, having in combination, means for advancing a series of line-wires, tensions for each of the line-wires, a bulldowser for spacing crimping and advancing the line-wires, means for inserting stay-wires across the line-wires at predetermined intervals, a series of twister-heads for uniting the stay-wires and the line-wires at their points of intersection, a knife for severing the stay-wires at the proper point, twisters for connecting the ends of the stay-wires to the outside line-wires, and a reel for receiving and winding the finished product.

5. In a wire-fence machine, a series of line-wire twisters each geared independent of the others yet adapted to rotate simultaneously by means of a horizontal oscillating rack, means for shooting a stay-wire through the loops formed in the line-wires by said twisters, and means for advancing the finished product, substantially as described.

6. In a power-operated wire-fence machine, a series of line-wire twisters mounted horizontally to move rotatably by a transverse differential slidable rack meshing with gear-wheels in the rear of the twisters, a cam-wheel for operating said rack, yokes secured to a rocking shaft with their upper ends traveling in channels in the finger-heads, means for rocking said shaft by cams to move the finger-heads back and forth at determined intervals, a pair of gear-wheels provided with contactible faces on a line with the channel in the twisters, means for bringing said wheels together for gripping the stay-wire and shooting it through said channel, a gate for closing the face of said channel during the interval the stay-wire is being shot therethrough, fingers for holding the ends of the stay-wire and bringing them into contact with the barrel-twisters after the stay-wire is positioned in said channel, means for severing the stay-wire to the proper length, and means for advancing the finished product, all substantially as shown and described.

7. In combination with a wire-fence machine, a series of horizontally-disposed twisters operated revolubly and intermittently by a transverse rack, said twisters consisting of a head with an open channel across its face, an oblong cavity in the center of said face, a shank with a round longitudinal opening therethrough, a gear-pinion secured on the rear end of said shank, a finger-head mounted in said cavity, a stem extending back from the finger-head through said opening through said shank, a channel-wheel mounted on the rear end of said stem, a U-shaped slot formed into one side of the finger-head, a channel formed across the face of the finger-heads, means for moving the finger-heads in and out of their respective cavities, means for revolving the twisters intermittently, means for shooting the stay-wire across the faces of the twisters and the finger-heads through all of said channels, independent means for securing the ends of the stay-wire to the outer line-wires, and means for advancing the finished product, substantially as described.

8. In combination with a wire-fence machine, a series of twisters intermittently revolved by a rack, fingers movable in and out of the heads, guides carrying vertical line-wires, a bar carrying said guides, a wabble-wheel and an arm operated thereby for actuating said guides horizontally to move the line-wires into engagement with said fingers, channels formed across the faces of the twisters and the fingers, permanent guides located between said twisters with channels across their faces, a gate for automatically closing and opening the faces of said channels, a cam and arm for operating said gate, means for shooting the stay-wire through said channels when the gate is closed, and means for advancing the finished product, and means for winding the finished product on a spool, all substantially as shown and described and for the purposes set forth.

9. In an automatic wire-fence-weaving machine, a supporting-frame having a bed-plate thereacross, a series of horizontally-disposed twisters for forming loops in the line-wires, a mechanism for shooting the line-wires through the loops thus formed, a ratchet-wheel for advancing the bulldowser step by step and for revolving the spool carrying the finished product, pairs of fingers on the periphery of the bulldowser, bars carrying pins slidably mounted between the pairs of fingers, means for moving said bars endwise to cause said pins to engage and grip the line-wires between said fingers, and means for automatically operating the several mechanisms by power, substantially as shown and described.

10. In a wire-fence machine having a main shaft revolubly mounted across one end of the machine, a secondary shaft operated by and at right angles to the main shaft and extending longitudinally of the machine, a gripping-wheel carried on one end of the main shaft, a second gripping-wheel mounted eccentrically below the first-named gripping-wheel on an independent shaft, a three-part adjustable cam secured on the main shaft, an arm secured to the shaft of the second gripping-wheel for engaging said cam whereby said second gripping-wheel is moved to and from the first gripping-wheel at each revolution of the main shaft, all substantially as shown and described and for the purposes set forth.

11. In a wire-fence machine, a series of independent line-wire twisters arranged horizontally and revoluble in unison intermittently by a horizontal oscillating rack for engaging and forming loops in the line-wires, means for shooting a stay-wire horizontally through the loops in the line-wires, means for severing the stay-wire at the proper point, means for twisting the ends of the stay-wire around the outside line-wires, and means for advancing the finished product, substantially as described.

12. In a wire-fence machine carrying a series of line-wires horizontally, a twister-head for each line-wire adapted to grasp and loop its line-wire at predetermined intervals, means for inserting a stay-wire through all of the loops, means for severing the stay-wire from its source of supply after being inserted, means for releasing the loops from the twisters after the line-wire has been inserted, and means for advancing the line-wires the distance of the width of the mesh, all substantially as shown and described.

13. In a wire-fence machine operative by power from a continuously-revolving main shaft, a series of twister-heads having movable fingers therein with U-shaped slots formed in said fingers, means for moving the line-wires into said slots, means for partially revolving the twister-heads and fingers to form loops in the line-wires, a channel formed across the twister-heads and fingers, means for forming said channel continuous from end to end of the machine, means for inserting a cross or stay wire in said channel through all of said loops, means for applying tension to the line-wires and for advancing them at the proper time, and means for the excision of the stay-wires to the proper length, substantially as shown and described.

14. An automatic wire-fence machine having in combination means for advancing a series of line-wires under tension, a bulldowser for spacing crimping and advancing the line-wires in unison, twister-heads for engaging and forming loops in the line-wires, means for shooting the stay-wire through the loops formed in the line-wires, means for excision of the stay-wire, twisters for connecting each end of the stay-wire to the two outside line-wires, and means for repeating these operations indefinitely, all substantially as shown and described.

In testimony whereof I have hereunto signed my name to this specification in the presence of two subscribing witnesses.

WILLIAM N. PARRISH.

Witnesses:
R. E. RANDLE,
R. W. RANDLE.